United States Patent

Akiyama

[11] 4,387,299
[45] Jun. 7, 1983

[54] TRAVEL-DISTANCE SIGNAL GENERATOR FOR VEHICLES

[75] Inventor: Isao Akiyama, Shimada, Japan

[73] Assignee: Yazaki Sogyo Kabushiki Kaisha, Tokyo, Japan

[21] Appl. No.: 156,235

[22] Filed: Jun. 3, 1980

[30] Foreign Application Priority Data

Jun. 25, 1979 [JP] Japan .............................. 54/87204[U]
Aug. 10, 1979 [JP] Japan ............................ 54/111004[U]
Aug. 24, 1979 [JP] Japan ............................ 54/115685[U]

[51] Int. Cl.³ .............................................. G01D 5/34
[52] U.S. Cl. ................................. 250/231 SE; 324/175
[58] Field of Search .................... 250/231 SE, 237 G; 324/175; 340/347 P; 356/395

[56] References Cited

U.S. PATENT DOCUMENTS 4,162,399 7/1979 Hudson ........................... 324/175 X
4,204,115 5/1980 Boldridge ....................... 324/175 X
4,247,769 1/1981 Warner .......................... 250/231 SE

FOREIGN PATENT DOCUMENTS 2730737 1/1979 Fed. Rep. of Germany ...... 324/175

*Primary Examiner*—David C. Nelms
*Assistant Examiner*—Darwin R. Hostetter
*Attorney, Agent, or Firm*—Pollock, Vande Sande & Priddy

[57] ABSTRACT

A signal generator which generates one pulse for each predetermined distance of travel of a vehicle. A rotary member is driven by the rotation of a wheel of the vehicle, and the rotary member has arranged thereon reflecting and non-reflecting portions alternately with each other about a rotary shaft of the rotary member. A pair of optical transmission lines are disposed to confront at one end the surface of the rotary member on which the reflecting and non-reflecting portions are arranged. Light is emitted from a light emitting element to the other end of one of the optical transmission line, and light reflected by the rotary member is incident to the other optical transmission line and received by a photo detector provided at the other end of the optical transmission line. In dependence on whether the reflecting or non-reflecting portion of the rotary member lies opposite to the optical transmission lines, the output from the photo detector varies to provide a travel-distance signal.

8 Claims, 14 Drawing Figures

TRAVEL-DISTANCE SIGNAL GENERATOR FOR VEHICLES

BACKGROUND OF THE INVENTION

This invention relates to a travel-distance signal generator for a vehicle, e.g., a taxi meter or the like, which is adapted to produce a travel-distance signal for each predetermined distance of travel of the vehicle.

As travel-distance signal generators for vehicles, there have been mainly used or proposed signal generators forming a portion of an electromagnetic induction system, a variable reactance system or a photoelectric system. In the signal generator of the electromagnetic induction system, a magnet is rotated in proportion to the rotation of a wheel of the vehicle, a detecting coil is disposed near the magnet, and the magnetic flux of the magnet crosses the detecting coil a predetermined number of times with one rotation of the magnet to induce one pulse voltage in the detecting coil for each predetermined distance of travel, for example, 50 cm. The number of pulse voltages thus induced in the detecting coil is in proportion to the distance of travel of the vehicle, and the frequency of the induced pulse voltages is in proportion to the speed of the vehicle. In the signal generator of the variable reactance system, an electromagnetic shield plate is interposed between detecting coils formed by two electromagnetically coupled coils, and in proportion to the travelling speed of the vehicle, the electromagnetic shield plate is rotated to repeatedly turn on and off the electromagnetic coupling of the two coils. As a result of this, one pulse voltage is derived from the detecting coil for each predetermined distance of travel of the vehicle.

The signal generators of the electromagnetic system and the variable reactance system are incapable of accurately detecting variations in the magnetic flux or the electromagnetic coupling state when the travelling speed of the vehicle is reduced to some extent. The signal generator of the photoelectric system is free from this defect. In the photoelectric system, a light emitting element and a photo detector are disposed opposite to each other so that the latter may receive light emitted from the former, and a light shield plate which rotates in proportion to the travel of the vehicle is repeatedly interposed between the light emitting element and the photo detector to derive one electrical pulse from the photo detector for each predetermined distance of travel of the vehicle. In this conventional signal generator of the photoelectric system, however, the converted electrical signal is applied via a signal line to a taxi meter, speedometer, tachometer or like instrument as is the case with the signal generators of the electromagnetic induction system and the variable reactance system, and a defect common to these prior art signal generators is that induced noise is liable to appear on the signal line; especially, in vehicles, there are many sources of pulse-like noise waves, such as an engine ignition device and so forth, and these pulse noises are likely to be induced in the signal line. It is difficult to sufficiently remove these noises by a waveform shaping circuit and there is a risk that the noise will be processed as a distance signal. Further, where the signal generator is installed in an engine compartment of the vehicle, since the temperature in the engine compartment becomes appreciably high, there are possibilities that the light emitting element and the photo detector of the signal generator of the photoelectric system will be markedly degraded and reduced in efficiency, resulting in an unsatisfactory performance being achieved. Under such high temperature conditions, the light emitting element and the photo detector become short-lived, and the operation of replacing them with new ones is very troublesome.

It is an object of the present invention to provide a photoelectric travel-distance signal generator for a vehicle which is insusceptible to the influence of a pulse-like noise generated in the vehicle and hence is capable of producing an accurate travel-distance signal.

Another object of the present invention is to provide a photoelectric travel-distance signal generator for a vehicle which is hardly degraded, long-lived and stably operates even if installed under relatively high temperature conditions.

Another object of the present invention is to provide a photoelectric travel-distance signal generator for a vehicle which is capable of attaining the abovesaid objects, easy to manufacture and little in dispersion in performance and which is able to produce a signal of high SN ratio.

Yet another object of the present invention is to provide a photoelectric travel-distance signal generator for a vehicle which produces, with a relatively simple structure, a distance signal in response to driving of the vehicle in one direction only.

SUMMARY OF THE INVENTION

In accordance with the present invention, a rotary member is rotatably supported in a casing, and a rotary shaft of the rotary member is driven from the outside at a revolving speed corresponding to the distance of travel of a vehicle. One end face of a plurality of each of optical transmission lines, which are provided for light irradiation use and photo detection use and which are disposed adjacent each other, are placed opposite to the rotary member, and these optical transmission lines are led out of the casing. A light emitting element is disposed opposite to the other end face of the optical transmission line that is used for light irradiation, and light emitted from the light emitting element is incident to the abovesaid optical transmission line. A photo detector is similarly disposed opposite to the other end face of the optical transmission line that is used for photo detection and receives light therefrom and converts it to an electrical signal. On the peripheral surface of the rotary member confronting the optical transmission lines, non-reflecting portions and reflecting portions having a higher reflection factor than the non-reflecting portions are alternately formed about the rotary shaft. When the light from the optical transmission line used for light irradiation is reflected by the reflecting portions, the reflected light is incident to the optical transmission line that is used for photo detection and is received by the photo detector. But, when the light from the optical transmission line used for light irradiation use is reflected by the non-reflecting portions, the reflected light incident to the optical transmission line used for photo detection is zero or very small in quantity. Accordingly, the output from the photo detector repeatedly varies its level to provide a pulse output, and this pulse output is generated for each predetermined distance of travel of the vehicle.

In order to provide a large difference between the outputs from the photo detector respectively based on the reflected lights from the reflecting and non-reflecting portions, the non-reflecting light portions are each formed to a surface that reflects the incident light to a direction different from the direction of the optical transmission line for photo detection. The optical transmission lines need not always be formed separately by bundling pluralities of optical fibers into individual optical cables but may also be formed by bundling a plurality of optical fibers into a single optical cable, and in the latter case, one end of the optical cable is disposed opposite to the rotary member and the other end portion is divided into two, one for light irradiation and the other for photo detection. A light shield is frictionally coupled with the rotary shaft in its direction of rotation. The range of rotation of the light shield is limited by stopper means, and at one end of the range of rotation, the light shield is interposed between the rotary member and the optical transmission lines to intercept the light from the optical transmission line. At the other end of the range of rotation, the light shield is placed apart from its position between the rotary member and the optical transmission lines. In this way, a distance signal is generated with the rotation of the rotary member when the vehicle travels forwardly, but no distance signal is produced even if the rotary member rotates when the vehicle backs.

DESCRIPTION OF THE PREFERRED EMBODIMENTS

To facilitate a better understanding of the present invention, a description will be given first of the vehicle travel-distance signal generator of the photoelectric system heretofore proposed.

Figure 1:
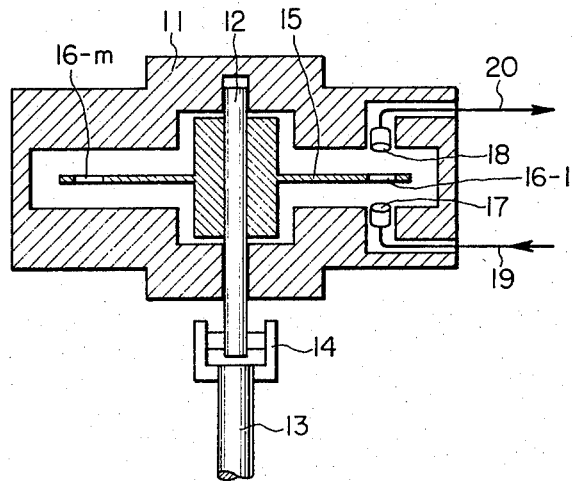
FIG. 1 is a sectional view showing, by way of example, a conventional photoelectric travel-distance signal generator for vehicles.

FIG. 1 illustrates the construction of the vehicle travel-distance signal generator of the conventional photoelectric system. A rotary shaft 12 is rotatably inserted into a casing 11. To the rotary shaft 12 is transmitted via a one-way clutch 14 the rotation of a drive shaft 13 which rotates corresponding to the rotation of a wheel. Accordingly, the rotary shaft 12 is driven in the casing 11 in accordance with the number of revolutions of the wheel when a vehicle is driven forward. A disc-shaped rotary member 15 is affixed to the rotary shaft 12. The rotary member 15 has a plurality of small holes 16-1, . . . 16-m, . . . 16-n (16-n being not shown) formed in its marginal portion and arranged on the same circle at equiangular intervals. In the casing 11, a light emitting element 17 and a photo detector 18 are disposed opposite to each other across the circular locus of the small holes 16. Lead wires 19 and 20 respectively connected to the light emitting element 17 and the photo detector 18 lead off the casing 11. The operating power for the light emitting element 17 is supplied thereto via the lead wire 19. When one of the small holes 16 lies opposite to the light emitting element 17, light emitted from the light emitting element passes through the small hole 16 to reach the photo detector 18, wherein it is converted to an electric signal, which is provided on the lead wire 20. When the rotary disc 15 turns to bring the small hole 16 out of alignment with the light emitting element 17, the light therefrom is intercepted by the rotary disc 15.

When a vehicle starts running, the drive shaft 13 rotates and this rotation is transmitted via the one-way clutch 14 to the rotary shaft 12. As the rotary disc 15 is driven by the rotation of the rotary shaft 12, the light directed from the light emitting element 17 to the photo detector 18 is periodically interrupted by the rotary disc 15. By this intermittent supply of light, electrical pulses are provided on the lead wire 20. The number of pulses thus obtained is in proportion to the distance of travel of the vehicle and the number of pulses per unit time is in proportion to the travelling speed of the vehicle. Accordingly, by counting the number of pulses derived from the lead wire 20, the travelling speed or the distance of travel of the vehicle can be measured.

The rotation of the vehicle's wheel has usually been transmitted in the following manner. A flexible shaft is coupled with a rotation detecting shaft of a transmission and is introduced into a speedometer, taxi meter or like measuring instrument provided in the instrument panel of the vehicle, driving the measuring instrument. In the case of using the travel-distance signal generator, however, since this signal generator is relatively bulky, it is installed in the engine compartment and electrical travel-distance signals derived from the signal generator are applied via a lead wire to the abovesaid measuring instrument. Since the temperature in the engine compartment becomes high, the travel-distance signal generator is subjected to as high a temperature as, for example, 120° C. or so. In the case of the travel-distance signal generator of the photoelectric system, the radiation efficiency of the light emitting element 17 and the photo detection efficiency of the photo detector 18 may sometimes be reduced at high temperatures and the light emitting element 17 and the photo detector 18 are markedly degraded. On top of that, pulse-like noise waves generated by an ignition device in the engine compartment are liable to appear on the lead wire 20 and the structure for removing this noise by a waveform shaping circuit on the side of the measuring instrument is complex and expensive and the noise cannot sufficiently be removed.

Figure 2:
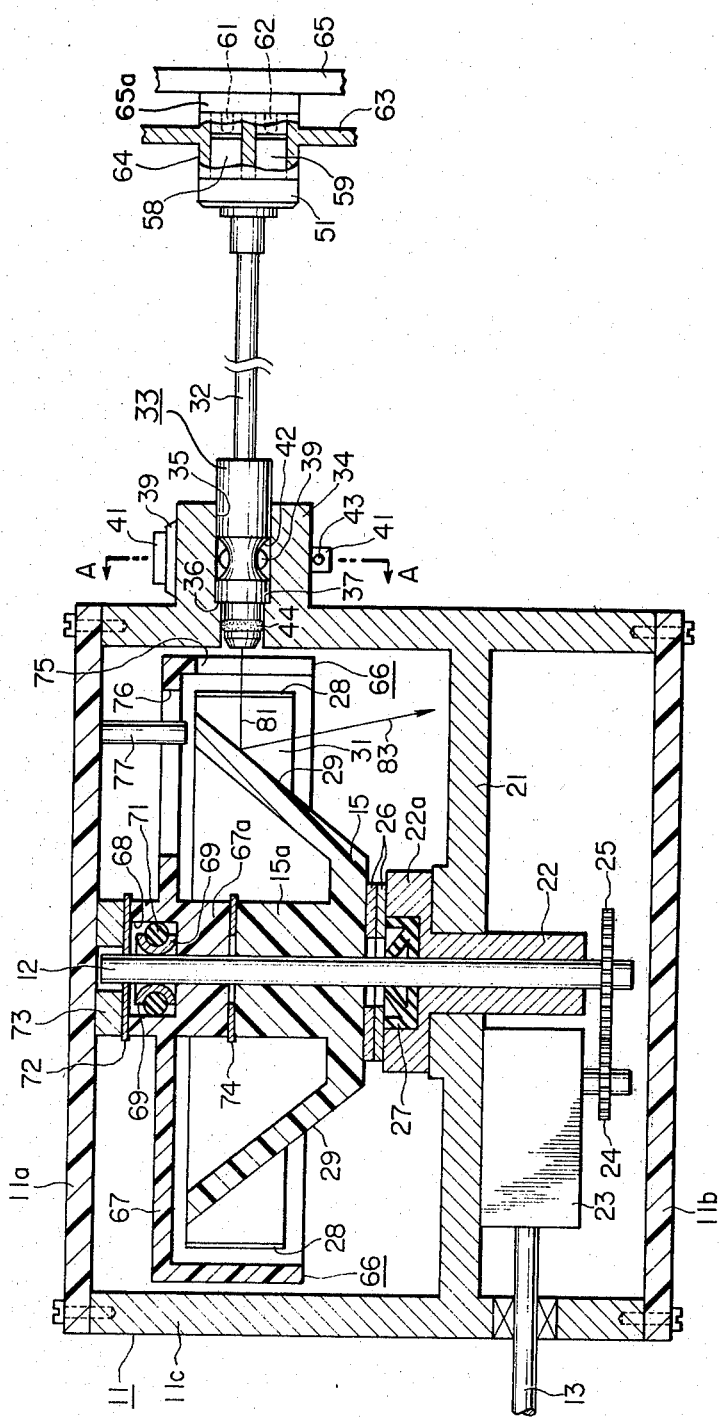
FIG. 2 is a sectional view showing an embodiment of the travel-distance signal generator of the present invention as applied to a taxi meter.

FIG. 2 illustrates in section an embodiment of the travel-distance signal generator of the present invention as applied to a taxi meter. The casing 11 is substantially rectangular in configuration and composed of a casing proper 11c formed by a die casting of aluminum and top and bottom panels 11a and 11b of a synthetic resinous material screwed to the top and bottom of the casing proper 11c to cover its upper and lower open ends. The casing 11 is divided internally by a partition wall 21 into upper and lower compartments. In the casing 11, a rotary shaft 12 is rotatably supported. A bearing 22 is fixedly inserted into the central portion of the partition wall 21 and the rotary shaft 12 is rotatably inserted into the bearing 22. A gear train 23 is mounted on the partition wall 21 on the side thereof facing the bottom panel 11b and the gear train 23 is driven by the drive shaft 13 introduced from the outside. An output gear 24 of the gear train 23 meshes with a gear 25 affixed to the rotary shaft 12 to transmit the rotation of the drive shaft 13 to the rotary shaft 12. In this case, the gear ratio of the gear train 23 is selected so that the rotary shaft 12 rotates once, for example, every 10 meters of forward motion of the vehicle.

In the upper compartment defined by the partition wall 21 and the top panel 11a, a rotary member 15 is mounted on the rotary shaft 12. The rotary member 15 is a molding of a heat resisting, plastic, synthetic resinous material such, for example, as polycarbonate. The rotary shaft 12 is pressed into a central hole of the rotary member 15 and in order to ensure coupling between them, the peripheral surface of that portion of the rotary shaft 12 which is inserted into the rotary member 15 is knurled, though not shown. The bearing 22 has a radially expanded thrust pad 22a on the side of the rotary member 15 and the thrust pad 22a receives the bottom of the rotary member 15 with washers 26 disposed therebetween. The thrust pad 22a has a centrally-disposed depression, in which a ring-shaped seal 27 is fitted to prevent a liquid from entering to the side of the rotary member 15 along the rotary shaft 12.

Figure 3:
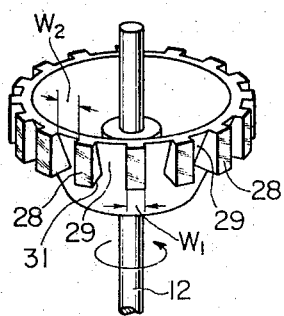
FIG. 3 is a perspective view of the rotary member 15 used in FIG. 2.

On the rotary member 15, light reflecting portions 28 and non-reflecting portions 29 smaller in reflection factor than the former are arranged alternately with each other on the same circle about the rotary shaft 12. In the illustrated embodiment, the reflecting portions 28 and the non-reflecting portions 29 are formed on the peripheral surface of the rotary member 15, and the non-reflecting portions 29 are formed to reflect light incident from the same direction back to a direction different from light reflected by the reflecting portions 28. As shown in FIGS. 2 and 3, the rotary member 15 has an inverted truncated conical peripheral surface disposed about the rotary shaft 12. Projections 31, each of which is parallel with the rotary shaft 12, are formed integrally with the rotary member 15 to surround the upper half portion of the conical peripheral surface. The peripheral surfaces of the projections 31 about the rotary shaft 12 are positioned on the same cylindrical surface at equal intervals about the rotary shaft 12. The rotary member 15 is formed of a black-colored synthetic resin and has a small light reflection factor. The peripheral surfaces of the projections 31 about the rotary shaft 12 are used as the reflecting portions 28 and are each deposited with, for example, a metal foil or a metal coated plastic film to provide an increased reflection factor. As the metal coated plastic film, there is now commercially available under the name of "hot stamp" a synthetic resin film having a metal vapor-deposited on one side thereof; the film is attached to an article by heating the synthetic resin film to melt it while pressing it against the article. The reflecting portions 28 can easily be formed by winding a glossy hot stamp of aluminum around the periphery of the rotary member 15 and heating the hot stamp while urging it against the rotary member to deposit the aluminum hot stamp only on the peripheral surfaces of the projections 31 of the rotary member 15. Each portion of the conical surface between adjacent ones of the projections 31 forms a non-reflecting portion 29. It is preferred that the widths $W_1$ and $W_2$ of the reflecting and non-reflecting portions 28 and 29 in the direction of their arrangement are selected to bear a relationship of 4:6.

Figure 4:
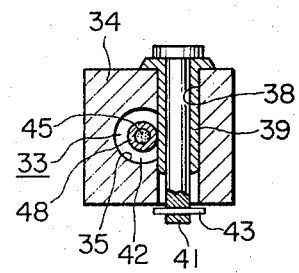
FIG. 4 is a sectional view taken on the line A—A in FIG. 2.

Optical transmission lines for light irradiation and reception are provided in opposing relation to the peripheral surface of the rotary member 15 in which the reflecting and non-reflecting portions 28 and 29 are provided. In the present embodiment, these optical transmission lines are formed by one optical cable 32. The optical cable 32 is coupled at one end with a plug 33, which is fitted into a through hole 35 of a cable mount 34 formed integrally with the side wall of the casing 11. The diameter of the through hole 35, at a position inner of the intermediate portion thereof, is reduced to form a stepped portion 36, and the plug 33 is conformed to the through hole 35; accordingly, the plug 33 has a stepped portion 37 at its intermediate portion in its axial direction. These stepped portions 36 and 37 engage each other to automatically determine the position of the inner end face of the plug 33 when it is inserted into the through hole 35. As shown in FIG. 4, a hole 38 for fixing use is formed in the cable mount 34 to extend perpendicularly to the through hole 35 though slightly deviated therefrom. A flexible auxiliary sleeve 39 is inserted in the hole 38 and a fixture pin 41 is inserted into the auxiliary sleeve 39. The through hole 35 and the hole 38 partly cross each other and hence intercommunicate, and the auxiliary sleeve 39 partly lies in the through hole 35 through the intercommunicating portion and is engaged with a ring-shaped engaging groove 42 cut in the peripheral surface of the plug 33. The auxiliary sleeve 39 has formed therein split grooves to extend from its one end, though not shown, and when the fixture pin 41 is inserted into the auxiliary sleeve 39, the sleeve 39 is slightly expanded and snugly engaged with the engaging groove 42 to firmly retain the plug 33 in position. A sealing wire 43 is inserted through the projecting end portion of the fixture pin 41. An O-ring 44 is mounted on the reduced-diameter portion of the plug 33 to achieve sealing against the outside.

Figure 5:
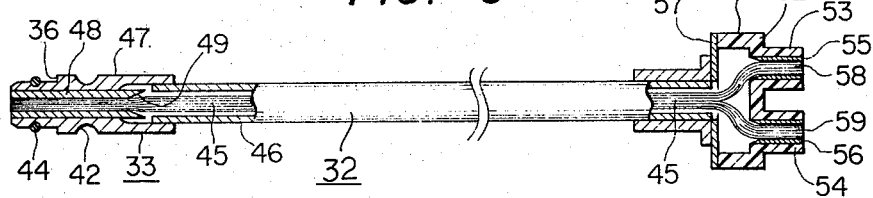
FIG. 5 is a sectional view showing an optical cable 32 and plugs 33 and 51 used in FIG. 2.

As shown in FIG. 5, the optical cable 32 is formed by bundling, for example, 800 optical fibers 45 and covering them with a coating 46 including a helical tube. One end portion of the optical cable 32 is inserted into the plug 33 and retained thereto. The plug 33 is relatively long and it is difficult to closely pack the optical fibers 45 into the plug 33. Especially, the inner diameter of that portion of the body 47 of the plug 33 receiving the naked optical fibers 45 is smaller than the inner diameter of the open end portion of the plug 33, so that when inserted into the plug 33, the optical fibers 45 are liable to get caught by the reduced-diameter portion. To avoid this, the optical fibers 45 are packed into an auxiliary tube 48 of metal and adhered thereto, and the auxiliary tube 48 is inserted into the plug body 47 and fixed therein. To facilitate insertion of the optical fibers 45 into the auxiliary tube 48, its one end portion is tapered away so that its inner diameter gradually increases toward the open end face, as indicated by 49. The opening of the other end face of the auxiliary tube 48 has a predetermined area and a predetermined configuration. Thus, when a predetermined number of optical fibers 45 are packed into the auxiliary tube 48, a required packing density is obtained. The other end of the optical cable 32 is inserted into a plug 51 and retained thereto. The plug 51 has cylindrical, optical fiber receiving projections 53 and 54 which are formed integrally with one end face of a plug proper 52 which is a molding of a synthetic resinous material. The optical fibers 45 are divided at the other end into two groups, which are respectively inserted into the cylindrical projections 53 and 54 and fixed therein. Also in this case, auxiliary tubes 55 and 56, similar to the tube 48, are used to receive the optical fibers 45. The opening of the plug proper 52 on the opposite side from the projections 53 and 54 is closed by a metal plate 57. One of the two groups of the optical fibers 45 is used as an optical transmission line 58 for light irradiation use and the other is used as an optical transmission line 59 for photo detection use.

As illustrated in FIG. 2, a light emitting diode or like element 61 and a photo transistor or like photo detector 62 are respectively provided opposite the end faces of those portions of the optical transmission lines 58 and 59 led out of the casing 11. A receptacle 64 is formed in one side panel of a metal casing 63 of the taxi meter for receiving the projections 53 and 54 of the plug 51, which is fixed as by screws to the casing 63. Disposed opposite the side panel of the casing 63 is a printed circuit board 65, on which is mounted a socket 65a. The socket 65a is partly inserted into the receptacle 64 from the opposite side, and the light emitting element 61 and the photo detector 62 are respectively disposed in the socket 65a in opposing relation to the end faces of the optical transmission lines 58 and 59 inserted in the receptacle 64.

The present embodiment is so constructed that a travel-distance signal is obtained only upon rotation of the rotary member 15 resulting from forward driving of the vehicle and no travel-distance signal is obtained upon rotation of the rotary member 15 in the case of backward driving of the vehicle. To this end, a light shield 66 is frictionally coupled with the rotary shaft 12. The light shield 66 is, for example, a cylindrical member which is disposed opposite the outer periphery of the rotary member 15 and coaxially therewith. The upper side of the light shield 66 on the side thereof facing the top panel 11a is covered with an end plate 67. The rotary shaft 12 is inserted in a bearing portion 67a of the end plate 67, and a recess 68 is formed in the bearing portion 67a on the side of the top panel 11a, and in the recess 68, a ring-shaped, wear-proof friction member 69 is mounted on the rotary shaft 12. The friction member 69 is made of, for example, a mixture of fluoric resin (Teflon) and molybdenum disulfide. The friction member 69 is clamped by a clamp ring 71, just like an O-ring, to the rotary shaft 12. The outer peripheral surface of the clamp ring 71 is firmly urged into frictional engagement with the inner wall of the recess 68, and this engagement is made more firm than the frictional engagement of the frictional member 69 with the rotary shaft 12. The end face of the bearing portion 67a on the side of the top panel 11a is butted against the top panel 11a through a washer 72 and a spacer 73. The end face of the bearing portion 67a on the side of the rotary member 15 is disposed on a bearing portion 15a of the rotary member 15 through a washer 74. The light shield 66 has formed therein a window 75 cut, for example, from the side of the bottom panel 11b.

Figure 6A:
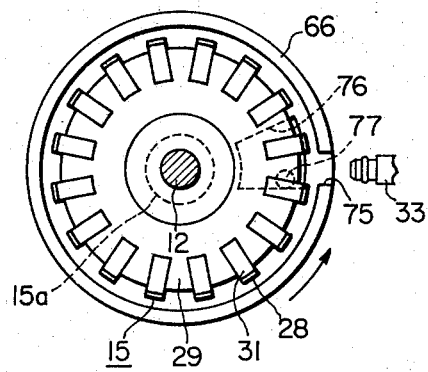
FIGS. 6A to C are sectional views showing the relationships of the rotary member 15, reflecting portions 28, non-reflecting portions 29, a light shield 66 and the plug 33 forming a part of an optical transmission line in various states.
Figure 6B:
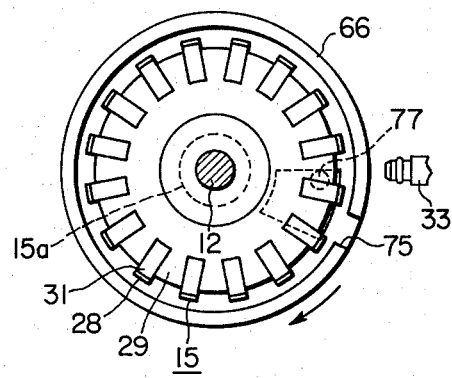

The light shield 66 is driven by the rotary shaft 12 frictionally coupled with therewith, but the range of rotational movement of the light shield 66 is limited. To achieve this, an opening 76 is made in the end plate 67 for receiving a limit pin 77 planted on the top panel 11a. For example, as shown in FIG. 6A, forward driving of the vehicle rotates the rotary shaft 12 counterclockwise, and at the same time, the rotary member 15 and the light shield 66 also rotate counterclockwise, as indicated by the arrow. But the rear edge of the opening 76 in the direction of rotation comes into engagement with the limit pin 77 to limit further rotation of the light shield 66, whereas the rotary shaft 12 continues rotation while slipping on the friction member 69. At this time, the window 75 of the light shield 66 confronts the plug 33, that is, one end face of the optical transmission line. When the rotary shaft 12 rotates clockwise (FIG. 6B) as the vehicle moves back, the rotary member 15 and the light shield 66 also rotate clockwise as indicated by the arrow. In this case, the rear edge of the opening 76 comes into engagement with the limit pin 77 in the direction of rotation of the light shield 66 to stop its further rotation, and at this time, the plug 33 confronts the light shield 66, so that no light is applied from the plug 33 to the rotary member 15.

Figure 6C:
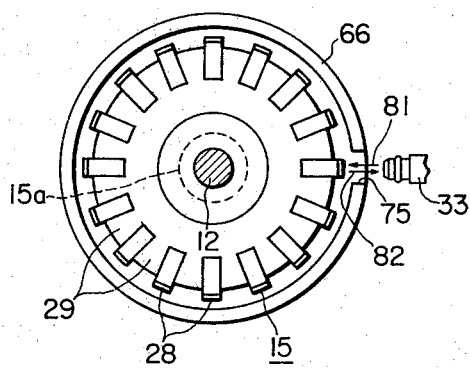

In the condition wherein the window 75 lies just in front of the plug 33, when a reflecting portion 28 of the rotary member 15 moves to a position opposite to the window 75, as shown in FIG. 6C, light from the light emitting element 61 in FIG. 2 passes through the optical transmission line 58 for irradiation use and is directed from the end face of the plug 33 to the reflecting portion 28 through the window 75, as indicated by 81, and the reflected light 82 from the reflecting portion 28 enters the plug 33 and is incident to the photo detector 62 passing through the optical transmission line 59 for photo detection use. If, however, a non-reflecting portion 29 faces the plug 33, as shown in FIGS. 2 and 6A, the light 81 from the plug 33 is incident to the non-reflecting portion 29 and is absorbed thereby and the remaining light is reflected, but the reflected light from the non-reflecting portion 29 is directed not to the optical transmission line or the plug 33 but to the partition wall 21, as indicated by 83 in FIG. 2. The reflected light 83 is absorbed by the partition wall 21, and it is considered that the light remaining unabsorbed would not be reflected back to reach the plug 33 passing through the above-said path and only a small part of scattered light by the non-reflecting portion 29 would be reflected back to the plug 33, but the reflected light thus reaching the plug 33 is very weak, and negligible. Consequently, while a non-reflecting portion 29 is opposite to the optical transmission line, the reflected light to the photo detector 62 is zero or very small in quantity. Accordingly, when the rotary member 15 rotates counterclockwise as indicated by the arrow in FIG. 6A, an electrical pulse is derived from the photo detector 62 every time a reflection portion 28 passes across the end face of the plug 33. The arrangement is such that one pulse is produced, for example, for each 50 cm distance of travel of the vehicle.

Figure 7:
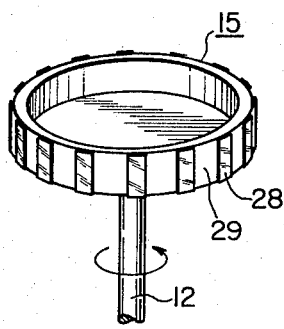
FIG. 7 is a perspective view illustrating another example of the rotary member 15.

If the light absorbing power of the non-reflecting portions 29 is sufficiently high and if the performance of a waveform shaping circuit for the output from the photo detector 62 is enhanced, it is also possible to employ an arrangement such as shown in FIG. 7, in which the reflecting portions 28 and the non-reflecting portions 29 are disposed in substantially the same cylindrical plane so that the reflected light from the non-reflecting portions may be incident to the plug 33. Also it is possible to adopt an arrangement in which the non-reflecting portions are provided in the form of through holes, as by forming cuts in the rotary member 15 to extend from the end face of its open end portion in FIG. 7, and in which the reflecting portions 28 are disposed on the same circle at equal intervals. But in order to install the signal generator in the vehicle, its overall structure must be small in size. From this pont of view, the structure in which the non-reflecting portions 29 are voids in the rotary member is unsuitable for manufacturing and low in mechanical strength. In contrast thereto, a rotary member 15 such as shown in FIG. 3 can be formed by a molding technique and is high in mechanical strength, and further, it is easy to provide a rotary member 15 which exhibits a large ratio between the outputs of the photo detector corresponding to the reflecting portions 28 and the non-reflecting portions 29.

By forming the reflecting portions 28 using the hot stamp vapor-deposited with glossy aluminum as described previously, the reflecting portions 28 can easily be formed to exhibit excellent reflection performance. In the case of using, as the light emitting element 61, a light emitting diode which emitted an infrared light having a wavelength of 750 m$\mu$, outputs of 4.0, 4.5 and 5.0 V were obtained with the reflecting portions 28 respectively formed by an aluminum foil and a chromium foil and with a mirror; but, an output of 5.25 V was obtained when the reflecting portion 28 was formed by the aforementioned aluminum hot stamp. Accordingly, it is appreciated that the use of the hot stamp allows ease in the formation of the reflecting portions and provides for enhanced reflection performance. Further, it has been ascertained that the ratio between the widths $W_1$ and $W_2$ of the reflecting and non-reflecting portions 28 and 29 is preferred to be 4:6 rather than 5:5, as referred to previously with regard to FIG. 3, to assure that the output from the photo detector 62 is based on the reflected light from a reflecting portion 28 rather than from a non-reflecting portion 29. The numerical values in this case are as follows: The widths $W_1$ and $W_2$ of the reflecting and non-reflecting portions 28 and 29 are respectively about 1.5 mm and about 4.0 mm; the diameter of the rotary member 15 is 15 mm; the number of the reflecting portions 28 is 20; the diameter of the bundle of optical fibers inserted in the plug 33 is about 1.6 m; 800 optical fibers 45, each having a diameter of 50$\mu$, are used; and the aforesaid infrared light is used. For providing a large difference between the outputs from the photo detector 62 respectively based on reflected light from the reflecting and non-reflecting portions 28 and 29, the optical path length for the reflected light 83 to the partition wall 21 in FIG. 2 is sufficient to be approximately 10 mm, even if the portion of the partition wall 21 to which the reflected light 83 is incident is not made to be excellent in light absorbing power. In an experiment, the reflecting portions 28 and the optical transmission line were spaced 2.5 mm apart, and the light shield 66 was 1.5 mm thick; when the light shield 66 is omitted, the distance between the reflecting portions 28 and the optical transmission line can be reduced to about 0.5 mm.

Figure 8A:
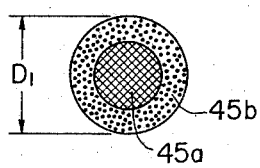
FIGS. 8A to C show various examples of an end face of the optical transmission line on the side of the rotary member 15.
Figure 8B:
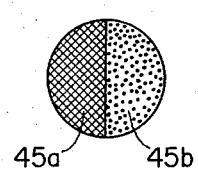
Figure 8C:
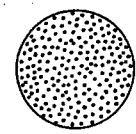

The optical transmission lines 58 and 59 may also be introduced into the casing 11 separately of each other in the same manner as on the side of the instrument, that is, on the sides of the light emitting element 61 and the photo detector 62. However, it is rather convenient for handling to assembly the two optical transmission lines 58 and 59 into one optical cable 32. In this case, the optical fibers 45 for light irradiation use and photo detection use are distributed at random in the end face of the optical cable 32 confronting the rotary member 15. In experiments in which 800 optical fibers made of a multi-component glass, each having a 50$\mu$ diameter, were tied up into an optical cable with a diameter $D_1$ of 1.6 mm, outputs of 3.5 to 3.7 V were obtained when optical fibers 45a for light irradiation use were all disposed centrally of the optical cable in the cross-section thereof and optical fibers 45b for photo detection use were all disposed around the optical fibers 45a, as shown in FIG. 8A which illustrates the end face of the optical cable facing the rotary member 15. In the cases where the optical fibers 45a and 45b were respectively disposed in the left and right half portions of the optical cable in the cross-section thereof, as shown in FIG. 8B, and where the optical fibers 45a and 45b were all disposed at random, as illustrated in FIG. 8C, outputs of 4.5 to 4.8 V were obtained. Arranging the optical fibers 45a and 45b separately of each other, as shown in FIGS. 8A and 8B, is complicated, and the optical fiber arrangement of FIG. 8A incurs a reduction of outputs. Therefore, it is preferred that the optical fibers for light irradiation use and those for photo detection use be distributed at random as shown in FIG. 8C.

What is important for preventing the output of the photo detector 62 from dispersion according to individual finished goods is the packing ratio of the optical fibers 45 in the end face of the optical cable confronting the rotary member 15, that is, in the plug 33. The output from the photo detector 62 is only 2.1 V in the case of a 70% packing ratio but becomes as large as 5.4 V in the case of a 75% packing ratio. By using the auxiliary tubes 48,55 and 56 as referred to previously in connection with FIG. 5, the packing ratio can easily be raised up to about 75% and the manufacturing efficiency is enhanced.

Figure 9:
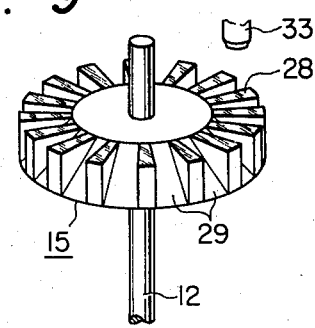
FIG. 9 is a perspective view illustrating another example of the rotary member 15.

With the use of the light shield 66 described previously the generation of the travel-distance signal by the rotation of the rotary member 15 in the case of the vehicle backing can be stopped relatively easily and the light shield can be constituted at low cost, as compared with a one-way clutch. The light shield 66 can be produced by the molding of a synthetic resinous material. The light shield 66 is frictionally coupled with the rotary shaft 12 and slippage occurs between them due to limitation of the range of operational movement of the light shield 66; but, in this case, the frictional engagement between the light shield 66 and the rotary shaft 12 is held substantially unchanged by employing the friction member 69 and the clamp ring 71 as described previously. It is also possible to omit the light shield 66 and use a one-way clutch 14 as shown in FIG. 1. The reflecting and non-reflecting portions 28 and 29 need not always be formed on the peripheral surface of the rotary member 15 but may also be provided, for example, on the end face of the rotary member 15 as depicted in FIG. 9. For holding constant the distance between the reflecting portions 28 and the optical transmission line and consequently the plug 33 in this example, it is preferable to provide the reflecting and non-reflecting portions on the peripheral surface of the rotary member 15.

Figure 10:
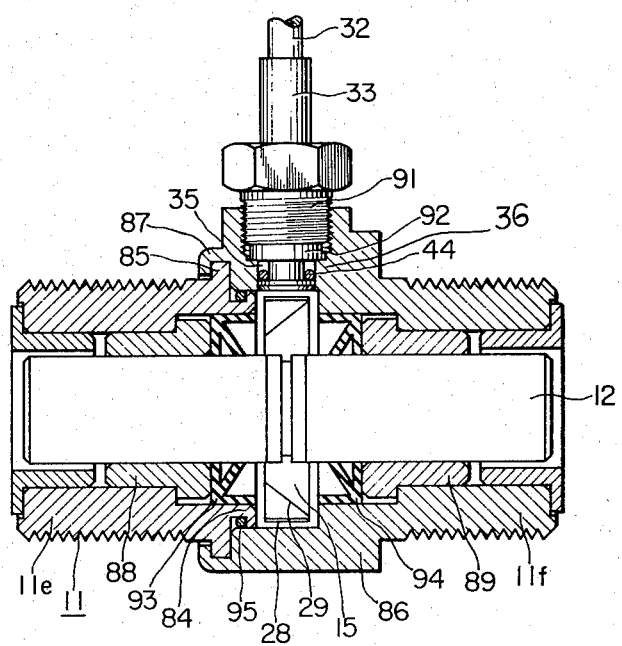
FIG. 10 is a sectional view showing the travel-distance signal generator of the present invention as applied to a speedometer.

The travel-distance signal generator of the present invention can be used not only for a taxi meter but also, for example, as an odometer, a speedometer and a tachometer. In this case, the signal generator is designed to generate a travel-distance signal regardless of the direction of rotation of the rotary member 15, and hence is simpler in construction than in the case of FIG. 2. FIG. 10 illustrates, by way of example, such a signal generator. The casing 11 is open at both ends and formed by butting together cylindrical members 11e and 11f. The outer diameter of one end portion of the cylindrical member 11e is slightly reduced to form an insertion portion 84, which is inserted into a receiving portion of the cylindrical member 11f which is formed by increasing the inner diameter of one end thereof. Adjacent the insertion portion 84 a flange 85 is formed integrally with the outer periphery of the cylindrical member 11e. The outer diameter of the cylindrical member 11f on the side where the cylindrical member 11e is coupled therewith is increased to form a coupling portion 86, and the flange 85 is inserted into the casing 11 from the end face of the coupling portion 86. A ring-shaped projection 87 is formed as a unitary structure with the coupling portion 86 and staked to urge the flange 85 against the end face of the coupling portion 86, by which the cylindrical members 11e and 11f are coupled together to make up the casing 11.

The rotary shaft 12 is disposed on the axis of the cylindrical members 11e and 11f. The rotary shaft 12 is held rotatable by ring-shaped bushings 88 and 89 interposed between the rotary shaft 12 and the cylindrical members 11e and 11f. In the coupling portion 86, the rotary member 15 is mounted on the rotary shaft 12, the reflecting and non-reflecting portions 28 and 29 being formed alternately with each other on the peripheral surface of the rotary member 15 in its circumferential direction. The through hole 35 is made in the side wall of the coupling portion 86 and the plug 33 is inserted into the through hole 35 and the end face of the plug 33 is placed opposite to the peripheral surface of the rotary member 15. A threaded tube 91 is mounted on the plug 33 and threadably engaged with a screw cut in the inner wall of the through hole 35, so that a flange 92 formed at the intermediate portion of the plug 33 is pressed by the end face of the threaded tube 91 against the stepped portion 36 to fix the plug 33 to the coupling portion 86. Oli seals 93 and 94 are respectively disposed on the bushings 88 and 89 on both sides of the rotary member 15, and an O-ring 95 is mounted on the outer peripheral surface of the insertion portion 84 of the cylindrical member 11e. The other end of the optical cable 32 has the same structure as shown in FIG. 2.

Since the operation of the travel-distance signal generator illustrated in FIG. 10 is the same as in the foregoing embodiments, no description will be repeated. As described above, the signal generator of the FIG. 10 embodiment is simpler in construction than the embodiment illustrated in FIG. 2 and can be made small in size; therefore, the signal generator can also be installed with the rotary shaft 12 coupled directly, for example, with the transmission pick-up shaft of the vehicle. Further, in this embodiment, coupling grooves are cut in both end faces of the rotary shaft 12, and a rotation transmission shaft from a wheel is engaged with the groove in one of the end faces of the rotary shaft 12 by which the rotary shaft 12 can be driven with the rotation of the wheel and, at the same time, the rotation of the rotary shaft 12 can be transmitted from its other end face to some other part.

As has been described in the foregoing, the travel-distance signal generator of the present invention transmits a signal as an optical signal, and hence is hardly affected by noises although there are many sources of pulse-like noise waves in vehicles. Furthermore, even if installed under high temperature conditions in the engine compartment, the signal generator of the present invention can be used stably for a long time without reduction of its performance.

It will be apparent that many modifications and variations may be effected without departing from the scope of the novel concepts of this invention.

What is claimed is:

1. A signal generator for a vehicle adapted to produce a signal, having a high signal to noise ratio, which is indicative of the travel of the vehicle, said signal generator comprising:

a casing located near the engine compartment of the vehicle;

a rotary shaft rotatably supported in said casing and driven at a rate of rotation which is proportional to the speed of travel of the vehicle, and through a number of revolutions which is proportional to the distance of travel of the vehicle;

a rotary member mounted on said rotary shaft within said casing, said rotary member being formed of a black-colored synthetic resinous material having a small light reflection factor;

a pair of optical fiber transmission lines for light irradiation use and for photo detection use, each of said optical fiber lines having one end thereof disposed adjacent the engine compartment of the vehicle in facing relation to said rotary member and the other end led out of said casing and connected to a meter located in the passenger compartment of the vehicle;

a light emitting element disposed adjacent the passenger compartment of the vehicle at the other end of the optical fiber transmission line used for light irradiation for effecting the transmission of light toward said casing and the rotary member therein;

a photo detector disposed adjacent the passenger compartment of the vehicle at the other end of the optical fiber transmission line used for receiving light therefrom and operative to convert the received light into an electrical signal; and reflecting portions and nonreflecting portions alternately arranged about said rotary shaft on the peripheral surface of said rotary member confronting the said one ends of said pair of optical fiber transmission lines, said reflecting portions being defined respectively by pieces of metal coated plastic film which are mounted in spaced relation to one another about the peripheral surface of said rotary member, the surface of each of said nonreflecting portions being slanted with respect to the surfaces of adjacent ones of said reflecting portions so that any reflection by said nonreflecting portions of incident light from the optical transmission line used for light irradiation is reflected into a direction different from the direction of light reflection of said reflecting portions and away from said one end of the optical fiber line used for photo detection.

2. A signal generator according to claim 1, wherein the widths of the reflecting portions and the nonreflecting portions in the direction of rotation of the rotary member have a ratio of substantially 4:6.

3. A signal generator according to claim 1, wherein said optical fiber transmission lines are a pair of optical cables, each having a plurality of optical fibers.

4. A signal generator according to claim 3, wherein both of said optical cables are assembled into a single optical cable; the optical fibers for light irradiation use and the optical fibers for photo detection use being intermingled at one end face of said single optical cable in confronting relation to the rotary member; and the other ends of the optical fibers being divided into two groups, one for light irradiation and the other for photo detection, said one group being disposed in facing relation to said light emitting element and said other group being disposed in facing relation to said photo detector.

5. A signal generator according to claim 3, wherein at least one of the optical cables is inserted into a plug and fixed thereto; the optical fibers of the optical cable inserted into the plug being packed into an auxiliary tube; the inner surface of the auxiliary tube being tapered so that its inner diameter gradually increases at the fiber insertion end of said auxiliary tube; and the said auxiliary tube being inserted into said plug and fixed thereto.

6. A signal generator according to claim 1, wherein the rotary shaft extends through the casing; and the rotary member is mounted on the rotary shaft at an intermediate position in the casing.

7. A signal generator according to claim 1, wherein a light shield is frictionally coupled with the rotary shaft to rotate therewith; the range of rotation of the light shield being limited by stopper means, the light shield being interposed between the rotary member and both of said optical fiber transmission lines at one end of said range of rotation and being displaced from the position between said rotary member and said optical fiber transmission lines at the other end of said range of rotation.

8. A signal generator according to claim 7, wherein the frictional coupling is achieved by a wear-proof friction member mounted on the rotary shaft and a clamp ring clamping the friction member to the rotary shaft, the clamp ring being frictionally coupled with the light shield more strongly than the frictional coupling between the friction member and the rotary shaft.

* * * * *